United States Patent [19]

Yamamoto et al.

[11] Patent Number: 5,788,811
[45] Date of Patent: Aug. 4, 1998

[54] METHOD AND APPARATUS FOR PEELING COATING FROM COATED PLASTICS AND METHOD FOR RECYCLING PLASTICS

[75] Inventors: Hiroshi Yamamoto, Tokyo-to; Yoshihiro Banno; Hiroyuki Tsuruta, both of Yokkaichi, all of Japan

[73] Assignees: Mitsubishi Chemical Corporation; Fuji Jukogyo Kabushiki Kaisha, both of Tokyo, Japan

[21] Appl. No.: 337,436

[22] Filed: Nov. 8, 1994

[30] Foreign Application Priority Data

| Nov. 8, 1993 | [JP] | Japan | 5-278295 |
| Feb. 7, 1994 | [JP] | Japan | 013821 |
| Feb. 19, 1994 | [JP] | Japan | 6-013822 |
| Mar. 22, 1994 | [JP] | Japan | 6-050777 |

[51] Int. Cl.$^6$ .................................................. B32B 35/00
[52] U.S. Cl. ...................... 156/584; 156/344; 156/389; 264/37
[58] Field of Search ........................ 156/94, 344, 389, 156/584; 264/37

[56] References Cited

U.S. PATENT DOCUMENTS

| 4,599,131 | 7/1986 | Matuszak . | |
| 5,194,109 | 3/1993 | Yamada | 156/344 X |
| 5,304,276 | 4/1994 | MacLeod et al. | 156/584 X |
| 5,478,434 | 12/1995 | Kerr et al. | 156/584 |

FOREIGN PATENT DOCUMENTS

| 0 369 341 | 5/1990 | European Pat. Off. . | |
| 548856 | 8/1932 | German Dem. Rep. | 156/584 |
| 59-142115 | 8/1984 | Japan | 156/344 |
| 63-202409 | 8/1988 | Japan | 156/344 |

OTHER PUBLICATIONS

Patent Abstracts of Japan, vol. 8, No. 270 (M-344) (1707), Dec. 11, 1984, JP-A-59 142 115, Aug. 15, 1984.
Patent Abstracts of Japan, vol. 11, No. 218 (M-607), Jul. 15, 1987, JP-A-62 035 809, Feb. 16, 1987.
Patent Abstracts of Japan, vol. 5, No. 101 (M-76) [773], Jun. 30, 1981, JP-A-56 044 623, Apr. 23, 1981.
Patent Abstracts of Japan, vol. 17, No. 385 (M-1448), Jul. 20, 1993, JP-A-5 069 443, Mar. 23, 1993.
Database WPI, Derwent Publications, AN 77-65948Y, JP-A-52 093 488, Aug. 5, 1977.
Patent Abstracts of Japan, vol. 5, No. 135 (M-85) [807], Aug. 27, 1981, JP-A-56 070 915, Jun. 13, 1981.
Patent Abstracts of Japan, vol. 18, No. 173 (M-1581), Mar. 24, 1994, JP-A-5 337 941, Dec. 21, 1993.

Primary Examiner—Mark A. Osele
Attorney, Agent, or Firm—Oblon, Spivak, McClelland, Maier & Neustadt, P.C.

[57] ABSTRACT

There is provided a method for peeling a coating from coated plastics, comprising applying a shear stress to a plastic product having a coating thereon, optionally after preforming the plastic product into a flat plate form, thereby to peel the coating from the plastic product.

There is also provided an apparatus for peeling a coating from coated plastics, comprising a pair of rolls with a gap therebetween and driving means for rotating the pair of rolls, the rolls rotating at different peripheral speeds from each other and allowing a plastic body having a coating thereon to pass through the gap while applying a shear stress to the plastic body thereby to peel the coating from the plastic body.

Further, there is provided a method for recycling plastics, comprising applying a shear stress to a plastic product having a coating thereon, optionally after preforming the plastic product into a flat plate form, thereby to peel the coating from the plastic product, and then subjecting the coat-peeled plastic product to melting and molding.

11 Claims, 5 Drawing Sheets

1

METHOD AND APPARATUS FOR PEELING COATING FROM COATED PLASTICS AND METHOD FOR RECYCLING PLASTICS

BACKGROUND OF THE INVENTION

1. Field of the Invention

This invention relates to a method and an apparatus for peeling a coating from coated plastics in a simple and effective manner. This invention also relates to a method for recycling plastics utilizing the above method and apparatus, which can provide recycled plastics at a low cost in a pollutionless manner without entailing a considerable lowering in the properties of the recycled plastics.

2. Background Art

Used plastics have hitherto been burned in an incinerator or buried together with other wastes under the ground. Combustion of such plastics increases carbon dioxide concentration in the air, leading to the serious problem of global warming. When they are buried under the ground, they cannot be decomposed by microorganisms and hence remain as they are, so that the amount of the plastics accumulated under the ground increases year by year.

In recent years, recycling of plastics has been advocated from the viewpoint of resource conservation and the earth's environmental protection.

However, various difficult problems should be solved in order to successfully recycle used plastics.

One of such problems is related to the fact that plastics as final products often are a composite of dissimilar materials, rather than a product of a single material. When such plastics as a composite are recycled without separation of the dissimilar materials, the recycled products often have inferior mechanical properties and appearance to those of the original plastics.

For example, when a coated plastic product, as such, is pulverized, repelletized with an extruder, and remolded by means of a molding machine into a recycled plastic product, the coating which has been formed on the surface of the original plastic product remains in the recycled plastic product without being finely dispersed therein. Since the coating that cannot be finely dispersed inhibits homogeneous blending of resins, the properties of the recycled product is considerably lowered.

Therefore, it is of most importance to remove a coating from a coated plastic product in advance of its reprocessing for recycling. To this end, the following methods may be considered or, have been proposed in the art.

① A method may be considered wherein a coated plastic product, as it is, is fed to an extruder, where the coating material which does not melt is removed by filtration through a screen such as a metal gauze. In this method, however, clogging of the screen will lower the throughput, resulting in a lowering of the production efficiency. Further, since the coating material cannot be effectively removed, no good recycled product can be obtained.

In order to minimize the lowering of production efficiency due to clogging of the screen, the provision of an equipment for automatic filter replacement and an increase in filtration area may be considered. With these countermeasures, however, the method is still deemed unsatisfactory.

② Japanese Patent Application Laid-Open No. 93157/1993 discloses a method wherein a large amount of a strong alkali is used to hydrolyze the coating of a coated plastic product. This method requires an additional equipment for waste water disposal.

2

③ Swelling of the coating of a coated plastic product using an organic solvent followed by peeling-off of the coating may be considered. This method will involve a great expense for the recovery of the solvent. Further, there is a fear of environmental pollution due to the use of the organic solvent.

④ Japanese Patent Application Laid-Open No. 273207/1990 proposes a method wherein a coating of a coated plastic product is removed by blasting with a soft abrasive material.

According to this method, when the shape of the coating surface is complicated, the blasting efficiency is low and the coating cannot be sufficiently removed. Further, this method is not suited for continuous treatment of coated plastic products having different shapes.

⑤ Japanese Patent Application No. 192431/1991 proposes a method which comprises heating a coated plastic product in the presence of water or an organic solvent, such as an alcohol, to a temperature of the melting point of the plastic or below or to a temperature above the melting point of the plastic thereby to hydrolyze the coating material, and then melting and kneading the plastic product to disperse the decomposed coating therein. The hydrolyzing treatment additionally requires the steps of waste liquor disposal and of drying after the treatment, resulting in an increased treatment cost. In addition, since the decomposed coating material is finally included in the recycled product, the properties thereof are likely to be lowered.

⑥ Japanese Patent Application Laid-Open No. 337941/1993 discloses an apparatus for peeling a coating from a coated plastic product.

This peeling apparatus, as shown in FIGS. 7 and 8, is so constructed that a plastic product, for example, a side moul 22, is carried by a pair of carrying rollers 21 into between rotators 23 and 24 each made of a synthetic resin foam, the carrying speed V of the side moul 22 being adjusted to be lower an the rotational peripheral speed of the rotators 23 and 24 so as to apply cutting and high frictional forces to a coating 22a and a double face adhesive tape 22b on the surfaces of the side moul 22, thereby cut-peeling the coating 22a and the double face adhesive tape 22b, and the side moul 22 is delivered outside the system by means of the pair of carrying rollers 21.

In the case of this apparatus, since a resin product is brought into contact with rotators 23, 24 each made of a synthetic resin foam, the rotators are subject to brittle fracture, which will generate dust and worsen the working environment. Further, this apparatus is unsuitable for use with bent or curved plastic products.

It is therefore an object of the present invention to provide a method and an apparatus for effectively removing a coating from coated plastics at low cost and in a pollutionless manner.

It is another object of the present invention to provide high-quality recycled plastics by utilizing the above method and apparatus.

SUMMARY OF THE INVENTION

It has now been found that a coating can be removed quite effectively from a coated plastic body by applying a shear stress to the plastic body. Based on such finding, the present invention has been accomplished.

Thus, the present invention provides a method for peeling a coating from coated plastics, comprising applying a shear stress to a plastic product having a coating thereon, optionally after preforming the plastic product into a flat plate form, thereby to peel the coating from the plastic product.

The present invention also provides an apparatus for peeling a coating from coated plastics, comprising a pair of rolls with a gap therebetween and driving means for rotating the pair of rolls, said rolls rotating at different peripheral speeds from each other and allowing a plastic body having a coating thereon to pass through the gap while applying a shear stress to the plastic body thereby to peel the coating from the plastic body.

The present invention further provides a method for recycling plastics, comprising applying a shear stress to a plastic product having a coating thereon, optionally after preforming the plastic product into a flat plate form, thereby to peel the coating from the plastic product, and then subjecting the coat-peeled plastic product to melting and molding.

According to the present invention, an effective removal of a coating from coated plastics can be made at low cost in a simple manner without causing environmental pollution. Moreover, recycled plastics can be obtained, according to the present invention, which have properties comparable to these of the original.

DETAILED DESCRIPTION OF THE INVENTION

Figure 1:
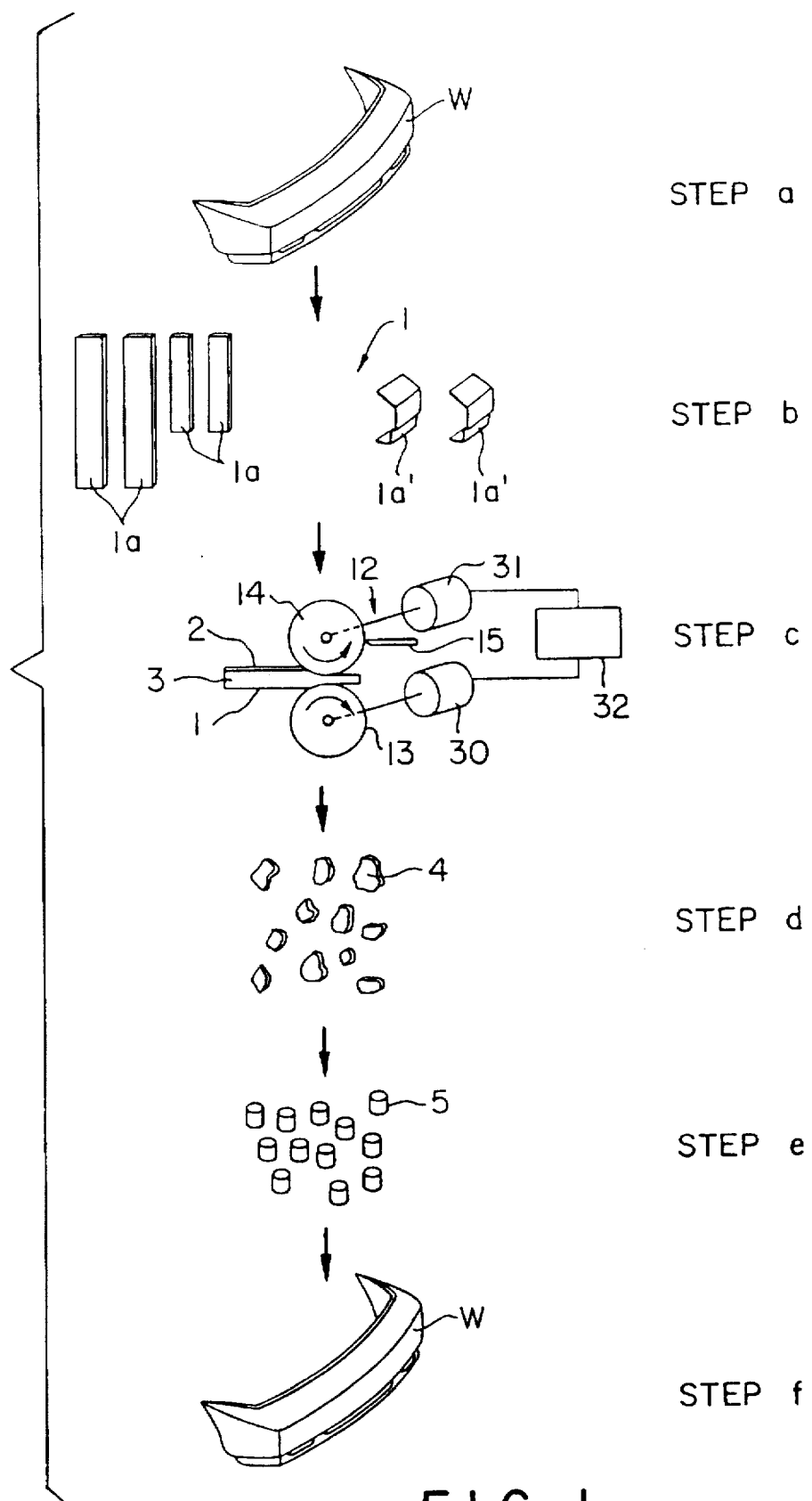
FIG. 1 is a schematic explanatory view showing an embodiment of the method for recycling plastics according to the present invention.

[I] Peeling of a Coating from Coated Plastics
(1) Coated plastics

Coated plastics to be processed according to the present invention may be any plastic products having a coating partially or entirely on its surface. Such plastic products include not only those products which have once been used but also those products which were produced for some use, but have become unnecessary for some reasons, e.g. failure to meet the product specifications.

The above plastic products may be molded products in various forms, for example, automobile exterior parts, such as automobile bumpers, wheel caps and side mouls, automobile interior parts, such as instrument panels, levers and upholstery foam linings, and electric appliances, such as cleaners, washing machines, refrigerators, lighting equipments and audio equipments, which are produced by molding of thermoplastic resins according to various molding methods, such as injection molding, extruding, blow molding, transfer molding and press molding.

<Substrate>

The substrate of the above plastic product may be made of any thermoplastic resin. Specific examples include olefin resins exemplified by ethylene resins, such as high-density polyethylene, medium-density polyethylene, low-density polyethylene and linear low-density polyethylene, and propylene resins, such as propylene homopolymer and propylene-ethylene block or random copolymer, thermoplastic polyester resins, such as polyethylene terephthalate and polybutylene terephthalate, engineering resins, such as polyamides, polycarbonates, polyphenylene ether and polyoxymethylene, styrene resins, such as acrylonitrile-styrene copolymer and acrylonitrile-styrene-butadiene copolymer, or composites (including alloys) of the above resins.

Among the above thermoplastic resins, olefin resins and composites containing olefin resins are preferred, and propylene resins are particularly preferred.

These substrates of coated plastics may also comprise additional components besides the above thermoplastic resins, for example, inorganic fillers, such as talc, glass fiber, titanium oxide and carbon, rubbers, such as natural rubber, ethylene-propylene copolymer rubber, styrene-butadiene rubber, styrene-isoprene rubber, acrylonitrile-butadiene rubber, isoprene rubber, urethane rubber and hydrogenated styrene-diene block copolymer, and pigments, such as quinacridone and ferrocyanine blue.

<Coating>
Primer

The coated plastic products to be processed according to the present invention may have a coating either directly on the substrate or via a primer layer.

Examples of the primer include modified propylene resins, such as chlorinated polypropylene resin and maleic acid-modified polypropylene, styrene-ethylene-butylene-styrene copolymer (SEBS copolymer) and styrene-ethylene-propylene-styrene copolymer (SEPS copolymer). Among them, chlorinated polypropylene resin is preferred.

These primers are used so as to form a primer layer having a thickness generally in the range of from 3 to 30 μm, preferably in the range of from 5 to 15 μm.

Paint

As a paint which is applied on a partial or the entire surface of the substrate of a plastic product to form a coating, mention may be made of organic solvent-based paints, water-soluble resin paints, water-dispersible resin paints and aqueous emulsion paints.

Specific Examples of such paints include paints comprising a resin component of an acryl, epoxy, polyester or alkyd resin and a crosslinking component of a urethane or melamine compound. Among others, paints comprising a resin component of an acrylic or polyester resin and a crosslinking component of a melamine or urethane compound (isocyanate crosslinking type) are preferred.

The paint may be used to form a coating having a thickness generally in the range of from 20 to 200 μm, preferably in the range of from 30 to 100 μm, and the amount of the paint used is generally not more than 10% by weight, preferably 7% by weight, based on the substrate.

(2) Preforming

The peeling of a coating from coated plastics according to the present invention may be conducted on a coated plastic product as it is; however, when the peeling of a coating is conducted using an apparatus comprising a pair of rolls, which will be described later, it is preferred to preform a coated plastic product into a shape of flat plate since in this case a higher shear stress can be applied thereto by the rolls and hence a coating can be peeled more sufficiently.

The preforming of a coated plastic product may be carried out by cutting, pressing or rolling, or any other suitable means.

(3) Heat treatment

It is sometimes preferred from the viewpoint of coat-peeling efficiency to subject a coated plastic product to a heat treatment before or simultaneously with the application of a shear stress to the product for peeling the coating. The heat treatment may be conducted by using an electric drier with internal air circulation, a burner type drier with internal air circulation or a high-frequency drier, and by heating a coated plastic product to a temperature below the melting point or glass transition temperature of the plastic, preferably to a temperature at least 5° C. below the melting point or glass transition temperature of the plastic.

When the heat treatment is carried out through atmospheric heating in a drier with internal air circulation, a coated plastic product is held at the above temperature generally for 15 to 180 minutes, preferably 30 to 150 minutes, more preferably 60 to 120 minutes.

In this case, the heat treatment may be carried out in a batchwise manner or a continuous manner using a tunnel-type drier.

When a plastic product comprises a propylene resin as a base, the heating temperature is generally in the range of from 70°to 165° C., preferably 70°to 160° C., more preferably 115°to 160° C.

(4) Apparatus

According to the present invention, a coating is peeled from a coated plastic product by applying a shear stress to the plastic product, more precisely, to the interface between the substrate layer and the coating layer of the plastic product. The shear stress to be applied should be higher than the bonding strength between the substrate layer and the coating layer. The application of such a shear stress to a coated plastic product may be made in various manners by using various types of apparatuses. However, preferably used in the present invention is an apparatus which comprises a pair of rolls with a gap therebetween and driving means for rotating the pair of rolls, the rolls rotating at different peripheral speeds from each other to pass a coated plastic product (preferably in the form of a flat plate) through the gap while applying a pressing force and a shear stress to the plastic product. Thus, according to this apparatus, an effective shear stress can be applied to a coated plastic product by a difference in peripheral speed between the two rolls. The difference in peripheral speed can be produced by different rotating speeds when the rolls have an identical diameter, whereas in the case of rolls having different diameters, an identical rotating speed may be adopted to provide different peripheral speeds.

There is no particular limitation on the materials of the rolls, however, it is generally preferred to use a metallic roll.

A roll having a surface roughened by satinizing, embossing or engraving to increase the coefficient of friction will apply a higher shear force and thus may preferably be used. However, a roll having a specular surface usually suffices.

A shear stress can be applied to a coated plastic product more effectively by arranging a roll with a higher peripheral speed on the side of the coating of the product and a roll with a lower peripheral speed on the side of the substrate of the product when the coated plastic product has the coating on its one surface.

It is usual to rotate the rolls in the same direction as the direction of advance of a coated plastic product. However, it is also possible to rotate one of the rolls in the opposite direction to the advance direction of a coated plastic product.

While a shear stress is applied to a coated plastic product as described above, a pressing force is also applied to the product by the rolls. The strength of the pressing force to be applied to a plastic product can be controlled by adjusting the width of the gap between the rolls relative to the thickness of the plastic product. The application of a higher pressing force to a coated plastic product makes the shear stress applied to the product higher, thus favoring the peeling of the coating. However, an excessively high pressing force may sometimes produces cleavages in the substrate portion of a coated plastic product, and the coating peeled from the substrate can undesirably enter into the cleavages.

When the rolls have specular surfaces and peripheral speed ratio between the rolls is 1:4, the strength of a pressing force to be applied to a coated plastic product should preferably be such that the plastic product will be compressed at a percentage compression of 40 to 80%, more preferably 50 to 70%.

In the above apparatus, the gap between the rolls is variable, and the rotating speeds of the rolls are individually variable. Further, the rolls may be provided with heating means.

Although the rolls may not be heated, they are, in some cases, heated for the purpose of making the peeling conditions constant. In this case, the heating may be carried out by any of electric, steam and oil heating means.

The shear stress to be applied to a coated plastic product varies depending upon various factors such as the strength of pressing force applied to the product (which is determined by the width of the gap between rolls relative to the thickness of the product), the difference in peripheral speed between the rolls, the difference in surface roughness between the rolls, the heating temperature of the rolls, the torque of the rolls, the kind of the coating, the bonding strength between the coating and the substrate, and the elasticity and size of the plastic product. Accordingly, the proper degree of shear stress to be applied to a plastic product is hard to precisely determine. If a coating cannot be sufficiently peeled from a coated plastic product in one operation, the plastic product may be again passed through between the rolls.

According to the present invention, it is also possible to use an apparatus comprising a plurality of pairs of rolls wherein each pair of rolls are arranged as described above, or an apparatus comprising a combination of three or more rolls disposed alternately parallel to each other.

After the coat-peeling is effected by means of the above apparatus, the plastics product may be subjected to brushing or the like to peel the remaining coating and remove the peeled coating.

[II] Production of Recycled Plastics (1) Size reduction

The substrate of a plastic product with the coating being peeled and removed therefrom as described above is optionally reduced into a size suitable for use in the later step of molding.

(2) Compounding of additional components

The substrate of a coated plastic product with the coating being peeled and removed therefrom is melted in an extruder or the like. Upon melting of the substrate, it may be blended with other components such as virgin plastics and auxiliary additives. The virgin plastic may be of the same kind as or different from the plastic of the substrate.

Examples of the auxiliary additives include antioxidants, such as hindered phenolic, sulfur and phosphoric antioxidants, photostabilizers, such as hindered amine, triazole, benzophenone, benzoate, nickel and salicylic acid photostabilizers, antistatic agents, lubricating agents, molecular weight modifiers, such as peroxides, metal deactivators, organic and inorganic nucleating agents, neutralizers, antacids, germicides, fluorescent brighteners, fillers and flameproofing assistants.

(3) Molding

After the melting and the optional blending with other components of the substrate of a plastic product, the molten material is optionally pelletized before subjecting it to molding.

The pelletization can be conducted by means of a single-screw or twin-screw extruder.

The extruder may be provided with a 20–200 μm metal gauze, a filter or other means for removing rubbish, metals and the like which are possibly contained in used plastics.

The pelletizing of the molten material with an extruder is not always necessary; the molten material may be directly subjected to molding into a recycled product.

Molding may be carried out by various molding methods, such as injection molding, extruding, blow molding, transfer molding and press molding. Molding conditions may be properly determined according to the properties of the plastic, the intended shape of the molded product, etc.

(4) Coating

The molded product may be used, as it is, as a recycled plastic product. Alternatively, the molded product may be coated partially or entirely on its surface with a paint such as an organic solvent-based paint, a water-soluble resin paint, a water-dispersible resin paint and an aqueous emulsion paint.

The above paints may be used generally in an amount up to 10% by weight, preferably up to 7% by weight, based on the substrate.

When the molded product is coated with a paint, a primer is preferably applied thereto prior to painting.

(5) Recycled products

The recycled plastic products obtained by the above procedures can be reused as various commercial products.

They may be reused, for example, as automobile exterior parts, such as automobile bumpers, wheel caps and side mouls, automobile interior parts, such as instrument panels, levers and upholstery foam linings, and electric appliances, such as cleaners, washing machines, refrigerators, lighting equipments and audio equipments.

[III] Preferred Embodiment of the Invention

The present invention will now be described more specifically by taking as an example the recycling of a coated automobile plastic bumper.

FIG. 1 is a schematic explanatory view showing steps or recycling a coated plastic bumper. The recycling steps comprise the step a of separating and recovering a coated plastic bumper from in-process defectives produced during the production and assembling processes of automobile bumpers, scrapped vehicles and the like, the step b of preforming by cutting the recovered bumper into several sections which are in a flat plate form or in a vertically split form, the step c of peeling a coating from the sections by means of an apparatus as shown in the figure, the step d of size-reducing the coat-peeled sections, the step e of obtaining pellets from the pulverized material, and the step f of molding a recycled product from the pellets.

The above steps will now be explained in more detail. In FIG. 1, reference character w in the bumper recovery step a denotes a coated plastic bumper which has been recovered from an in-process defective, a scrapped vehicle or the like and from which metal components have been removed. The bumper w is a coated plastic product consisting of the substrate made of a thermoplastic resin, such as a polypropylene resin, and a coating (including a primer layer) made of a thermosetting resin, such as aminopolyester, aminoacrylic, polyester-urethane or acrylic urethane resin.

Figure 2A:
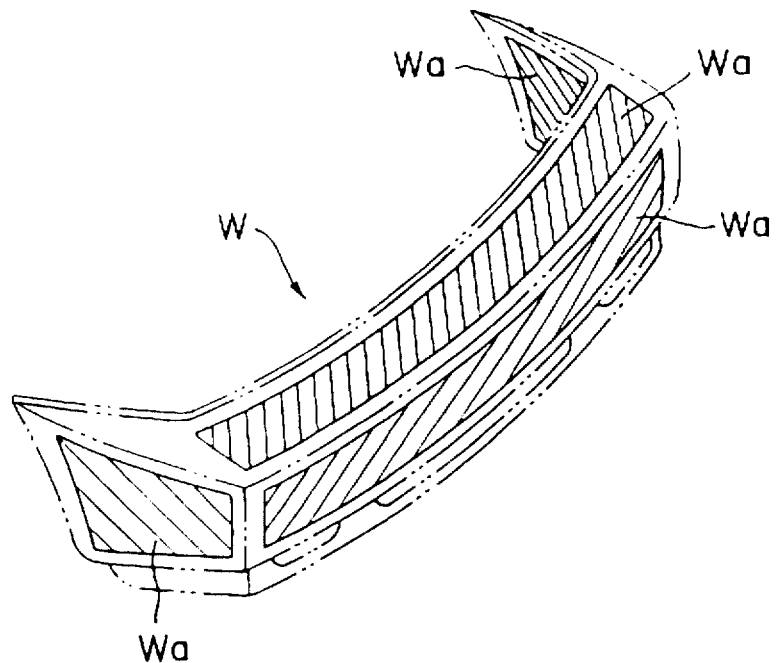
FIGS. 2A and 2B are an explanatory view showing an example of the preforming of a plastic product according to the present invention.
Figure 2B:
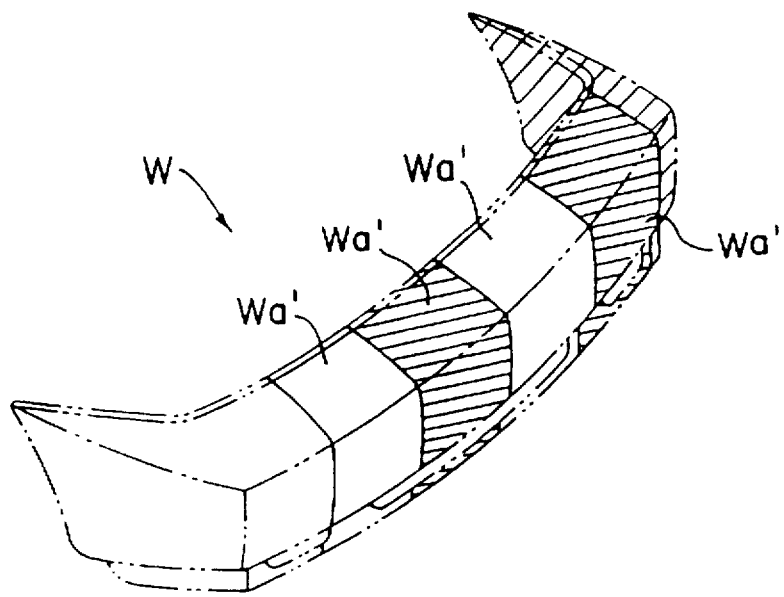

The bumper w from the bumper recovery step a is cut into a flat plate form or a vertically split form in the preforming step b so that the coating can be removed with a higher efficiency in the subsequent coat-peeling step c. The cutting may be carried out, for example, by cutting each of relatively flat plate portions wa, not including protrusions such as ribs, indicated in FIG. 2A, such as top, front and side portions, and, if necessary, further cutting the cut portions into flat plates 1a in a strip form. Alternatively, the bumper may be cut as indicated by wa' in FIG. 2B to prepare a plurality of vertically split parts 1a'.

Figure 3:
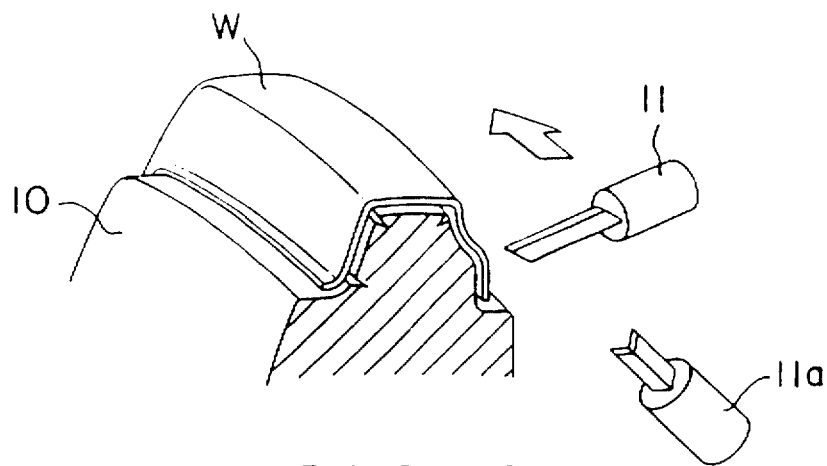
FIG. 3 is an explanatory view showing how to carry out the preforming shown in FIG. 2.

The section 1 can be easily obtained from the bumper w by, for example, cutting the umper w with a cutter 11 while holding the bumper w by a supporting member 10 fitted into the recessed portion of the bumper w as shown in FIG. 3 (perspective view of the principal part).

The coat-peeling step c, wherein a coating 2 is peeled from the section 1 obtained in the preforming step b, will now be described.

As shown in FIG. 1, an apparatus 12 to be used in the coat-peeling step c comprises a roll 13 on the side of the substrate (of the section 1) and a roll 14 on the side of the coating. These rolls are metallic rolls and arranged so as to face each other. They have a planished or chromium-plated periphery.

The roll 13 and 14 are driven by driving means 30 and 31, which are controlled by controller 32, so that they rotate at different peripheral speeds from each other, for example, so that the peripheral speed of the roll 14 to be in contact with the coating 2 is higher than the peripheral speed of the roll 13 to be in contact with the substrate 3.

The flat plate section 1, which passes through the gap between the rolls 13 and 14, is pressed by a pressing force applied by the rolls. At the same time, a shear stress is applied by the difference in peripheral speed between the rolls to the interface between the substrate 3 and the coating 2, whereby the coating 2 is peeled from the substrate 3.

Figures 4A, 4B:
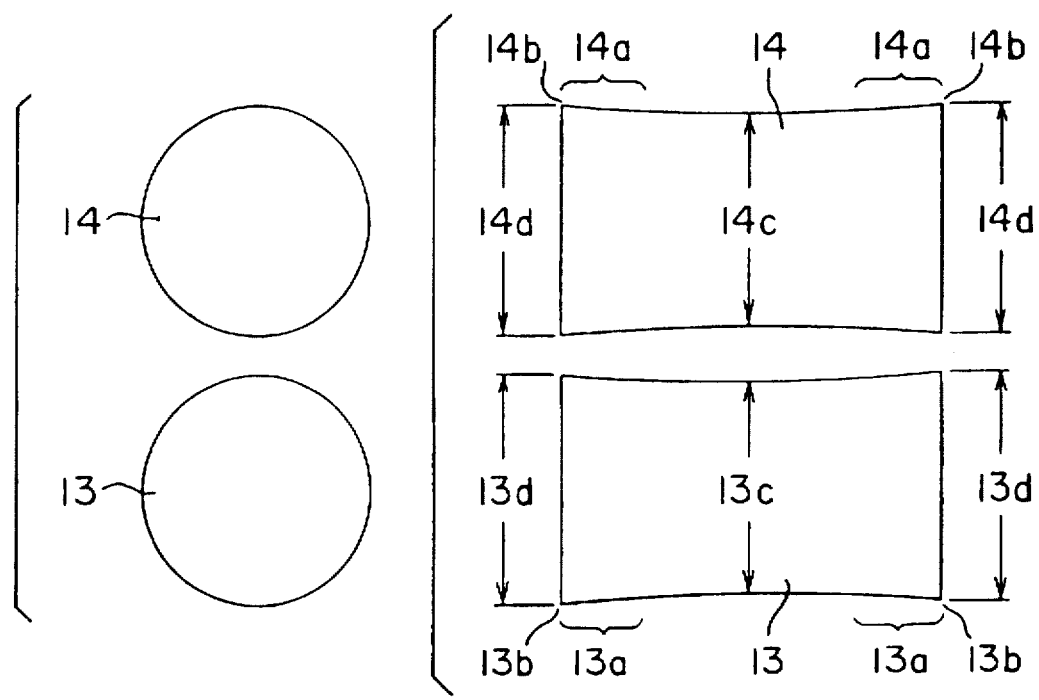
FIGS. 4A and 4B are a view of one embodiment of a pair of rolls to be used for the apparatus of the present invention.

The roll 13 arranged on the substrate side is, as shown in FIG. 4A front view and FIG. 4B side view, in such a taper form that the diameter of the roll 13 in its vicinity 13a of the edges gradually increases toward the edges 13b dependently or independently of the shape of the section 1 and accordingly the diameter 13d at the edges 13b is larger than the diameter 13c at the center portion.

Similarly, the roll 14 arranged on the coating side is, as shown in FIG. 4A front view and FIG. 4B side view, in such a taper form that the diameter of the roll 14 in its vicinity 14a of the edges gradually increases toward the edges 14b. When the section 1 passes between the rolls 13 and 14, the pressing force deforms the section so as to cause the center portions of both of the side edges to be protruded outward. In this case, since the rolls 13 and 14 are so tapered that the diameter gradually increases in their vicinities of the edges 13a and 14a toward their edges 13b and 14b, the width of the gap between the rolls 13 and 14 in their vicinities of edges 13a and 14a, where the both side ends of the section 1 are to be pressed, becomes smaller, so that a sufficient pressing force by the rolls 13 and 14 is ensured also in the both side ends of section 1. Therefore, a sufficient shear stress is also ensured to be applied to the both side ends of the section 1, as shown the rolls are continuously tapered so that their diameters gradually increase from the midpoint toward the edges of the rolls, thereby to successfully peel the coating 2 therefrom.

It is also possible for only one of the rolls to be so tapered as described above.

In FIG. 1, numeral 15 indicates a member such as a brush, a scraper or the like which is provided in contact with the roll 14 to scrape off the peeled coating 2 adhered onto the roll 14.

Figure 5:
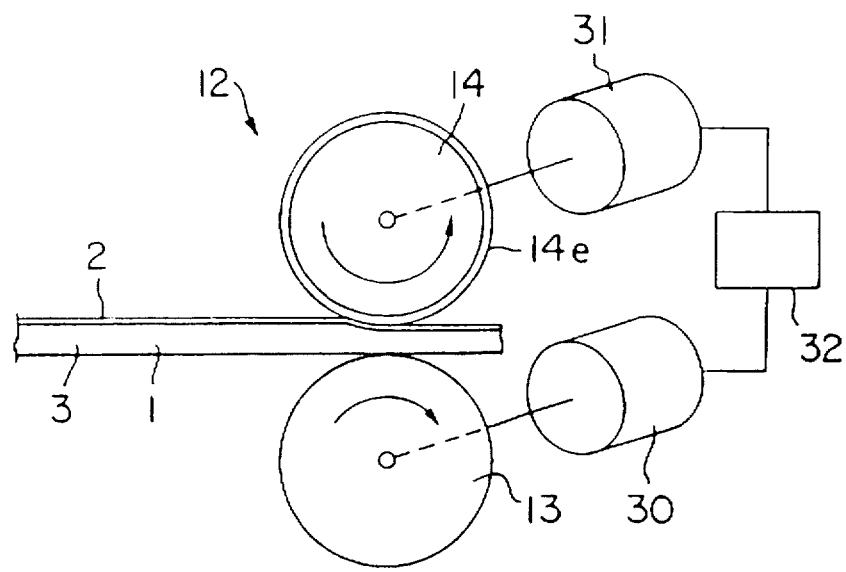
FIG. 5 is a view of one embodiment of the apparatus of the present invention.

FIG. 5 is an explanatory view of another embodiment of an apparatus 12 to be used in the coat-peeling step C, wherein parts corresponding to those of FIG. 1 are indicated by the same reference characters as those of FIG. 1. In this embodiment, the periphery of the roll 14 on the side of the coating is covered with an elastic material, for example, a rubber 14e, to increase the coefficient of friction between the roll 14 and the coating 2 of the section 1, thus rendering a higher shear stress to be applied to the interface between the substrate 3 and the coating 2 thereby to facilitate peeling of the coating 2 from the substrate 3. In addition, a deformation of the rubber 14e due to pressing against the section 1 serves to avoid the adherence of the coating 2 onto the roll 14 and, at the same time, to facilitate biting of the section 1 into the gap between the rolls, which improves the workability.

Figure 6:
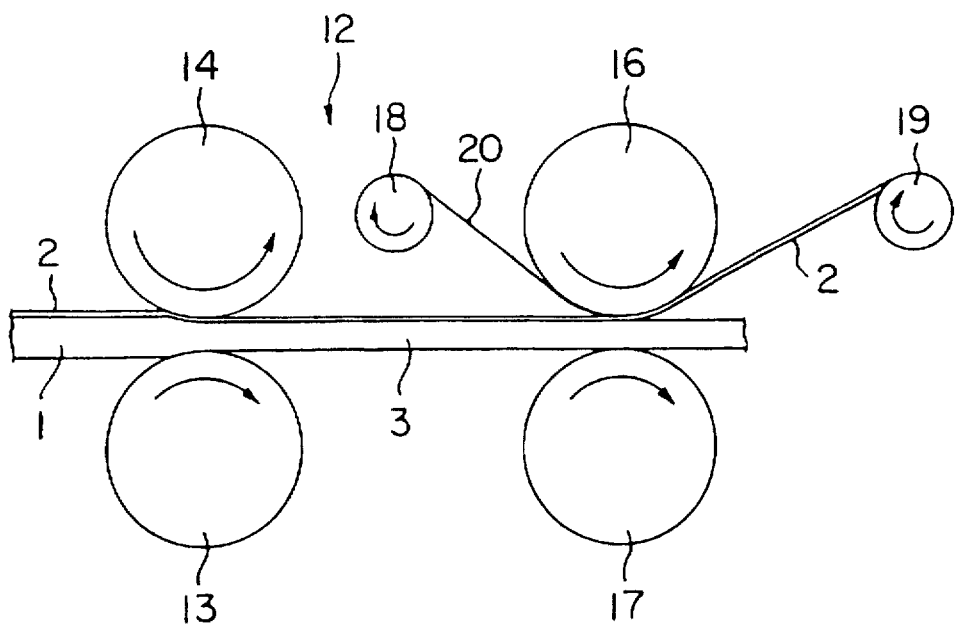
FIG. 6 is a view of another embodiment of the apparatus of the present invention.
Figure 7:
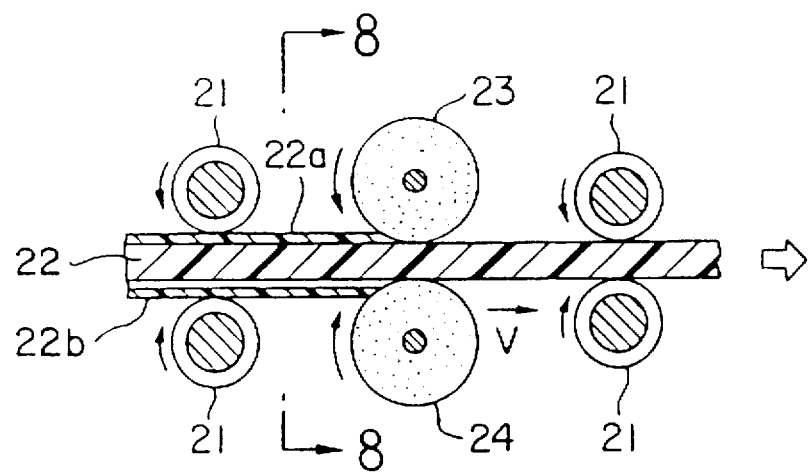
FIG. 7 is a schematic view of a conventional coat-peeling apparatus.
Figure 8:
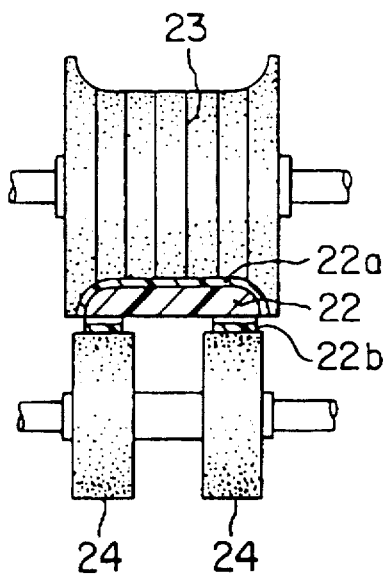
FIG. 8 is a cross-sectional view taken on line A—A of FIG. 7.

FIG. 6 is an explanatory view of yet another embodiment of the apparatus 12, wherein parts corresponding to those of FIG. 1 have the same reference characters as those of FIG. 1. In this embodiment, a pair of carrying rolls 16 and 17 for carrying the substrate 3 and the coating 2 remaining unremoved on the substrate 3 are provided on the downstream side of the rolls 13 and 14. A pressure-sensitive adhesive tape feed reel 18 for feeding a pressure-sensitive adhesive tape 20 and a pressure-sensitive adhesive tape take-up reel 19 for taking up the pressure-sensitive adhesive tape 20 are provided respectively upstream and downstream of the carrying roll 16 on the side of the coating. The pressure-sensitive adhesive tape 20 fed from the feed reel 18 is passed through between the carrying roll 16 and the remaining coating 2 and taken up by the take-up reel 19, whereupon the coating 2 adheres to the tape. The coating remaining on the substrate can thus be removed.

The coating 2, which has been peeled from but still remains on the substrate 3, can also be removed from the substrate 3 by other suitable means such as brushing with a rotary brush or blowing of a compressed air.

The substrate 3, which has been subjected to peeling of the coating 2 and pressing in the coat-peeling step c, is transferred to the pulverization step d where the substrate 3 is reduced in size by means of a shredder or the like to provide a size-reduced material 4. After the size reduction step d, it is possible to separate and remove the remaining coating from the size-reduced material 4 by means of a separator such as a pin mill or a gravity separator.

In the subsequent pelletizing step e, the size-reduced material 4 is fed into an extruder. In the extruder, the material 4 fed through a hopper is advanced in the barrel by the rotation of a screw while it is heated with a band heater or the like. The material 4 is melted in the course of advance in the barrel and extruded through a die to prepare pellets 5. In this pelletizing step, it is possible to remove the remaining coating by the provision of a fine-mesh screen at the forward end of the barrel. When the fine-mesh screen is made replaceable in an automatic manner, the output can be increased, thus enhancing the productivity.

In the molding step f, the pellets 5 obtained in the pelletizing step e are, if necessary, blended with pellets prepared from a virgin resin such as polypropylene, and subjected to molding into a molded product such as a bumper.

|IV| Experimental Examples

The following examples further illustrate the present invention but are not intended to be limiting thereof.

Examples 1 to 24 and Comparative Examples 1 to 13

(1) Preparation of substrate resin

A substrate resin having a melting point of 165° C. was prepared by blending 68% by weight of a propylene-ethylene block copolymer having an ethylene content of 5% by weight and a melt flow rate (MFR) of 30 g/10 min, 10% by weight of an ethylene polymer having a melt flow rate of 20 g/10 min and a density of 0.96 g/cm³, 20% by weight of an ethylene-propylene copolymer rubber having an ethylene content of 80% by weight and a Mooney viscosity ($ML_{1+4}$) of 70 as measured at 100° C. and 2% by weight of talc having an average particle diameter of 2 µm.

(2) Production of coated plastic product (a) Production of injection-molded product The above substrate resin was subjected to injection molding using an N-100BII injection molding machine manufactured by The Japan Steel Works, Ltd. under the conditions of a molding temperature of 220° C. and an injection pressure of 600 kg/cm² into injection-molded products in a plate form having a size of 120 mm×120 mm and a thickness of 2.0 mm and 3.0 mm.

(b) Application of primer The above injection-molded product was cleaned with a vapor of 1,1,1-trichloroethane, and a primer composed mainly of a chlorinated polypropylene resin was applied onto the product to form a 5 µm-thick primer coating.

(c) Preparation of coated plastic products

Production of coated plastic product A

A one-pack type white paint comprising an acrylic resin as a resin component and a melamine crosslinking component was coated on the primer-coated injection-molded product (120 mm×120 mm×3.0 mm) to form a 40 µm-thick coating which was then baked in an oven at a temperature of 100° C. for 60 minutes to prepare a coated plastic product A.

Production of coated plastic product B

A two-pack type white paint comprising a urethane resin as a resin component and a urethane crosslinking component was coated on the primer-coated injection-molded product (120 mm×120 mm×3.0 mm) to form a 40 µm-thick coating which was then baked in an oven at a temperature of 90° C. for 30 minutes to prepare a coated plastic product B.

Production of coated plastic product C

The above injection-molded product (120 mm×120 mm ×3.0 mm) was subjected to a plasma treatment [apparatus: microwave plasma treatment apparatus (TMZ-9602B manufactured by Toshiba Corp.), conditions: oxygen gas flow rate 400 cc/min, pressure 0.5 Torr, output 400 W, treatment time 10 seconds] by a method described in Japanese Patent Application Laid-Open No. 98140/1984, and a one-pack type white paint comprising an acrylic resin having a urethane bond as a resin component and a melamine crosslinking component was coated on the treated injection-molded product to form a 40 µm-thick coating which was then baked in an oven at a temperature of 120° C. for 30 minutes to prepare-a coated plastic product C.

Production of coated plastic product D

The above injection-molded product (120 mm×120 mm×3.0 mm) was subjected to the same plasma treatment as in the coated plastic product C, and a two-pack type white paint comprising a urethane resin as a resin component was coated on the treated injection-molded product to form a 40 µm-thick coating which was then baked in an oven at a temperature of 90° C. for 30 minutes to prepare a coated plastic product D.

Production of coated plastic product E

Coating was carried out in the same manner as in the coated plastic product A except that the injection-molded product (120 mm×120 mm×2.0 mm) was used instead of the injection-molded product (120 mm×120 mm×3.0 mm) to prepare a coated plastic product E.

Production of coated elastic product F

A coated plastic product F was prepared in the same manner as described above in connection with the coated plastic product A, except that the primer was coated to a thickness of 20 μm (about twice the thickness of the primer layer in the coated plastic product A).

Production of coated plastic product G

A one-pack type silver metallic paint comprising an acrylic resin as a resin component and a melamine crosslinking component was coated on the primer-coated injection-molded product (120 mm×120 mm×3.0 mm) to form a 40 μm-thick coating which was then baked in an oven at a temperature of 100° C. for 30 minutes. Further, the same paint was coated thereon to form a 20 μm-thick clear coating which was then baked in an oven at a temperature of 100° C. for 60 minutes to prepare a coated plastic product G.

(3) Peeling of coating from coated plastic product

Peeling of a coating from the above coated plastic products A, B, C, D, E, F and G was conducted by means of the following apparatus after or without the following heat treatment.

(a) Heat treatment

The heat treatment of the coated plastic product was carried out using an electric hot air drier at a temperature in the range of from room temperature to 65° C. for 2 hours.

(b) Peeling of coating

Thereafter, the peeling of a coating was carried out by means of an apparatus comprising a pair of rolls with a gap therebetween. The two rolls, which were identical to each other, were chrome-plated metallic rolls with a specular surface having a roll diameter of 152.4 mmø and a length of 380 mm. The rotating speed of the roll was varied in the range of from 6 to 24 rpm for the roll to be in contact with the substrate of the coated product and in the range of from 6 to 60 rpm for the roll to be in contact with the coating, and the rotating speed ratio of the former roll to the latter roll was in the range of from 1:1–10. The width of the gap between the rolls was varied in the range of from 0.5 to 3.0 mm. The rolls were sometimes used at room temperature without heating and were sometimes heated to 40° C.

The results are shown in Tables 1 to 3.

(4) Remolding

The plastic product of Example 5, from which the coating had been peeled by the above method, was pulverized in a pulverizer and then placed in an extruder. The pulverized material was heat-melted, kneaded and pelletized, and the pellets were injection-molded to prepare a recycled plastic product, which was then coated with a paint in the same manner as in Example 5. The mechanical properties (impact strength, rigidity and elongation) of the recycled coated plastic product were measured and found to be substantially the same as those of the original product prepared using a virgin resin, i.e. the coated plastic product of Example 5 (product A). The appearance was also substantially the same as that of the coated plastic product of Example 5.

Examples 25 to 29 and Comparative Example 14

The procedure of Example 5 was repeated, except that the sheet of the coated plastic product A was cut by means of a cutter into the sizes indicated in Table 4 and the peeling of a coating was conducted under the conditions indicated in Table 4.

The results are shown in Table 4.

Examples 30 to 33 and Comparative Examples 15 and 16

Both of the two chromium-plated rolls of the above apparatus were replaced with the same but embossed rolls, and peeling of a coating was carried out for the coated plastic product A.

The results are shown in Table 5.

TABLE 1

| | | Examples | | | | | | Comp. Examples | | | | Examples | | | Comp. Examples | |
|---|---|---|---|---|---|---|---|---|---|---|---|---|---|---|---|---|
| | | 1 | 2 | 3 | 4 | 5 | 6 | 1 | 2 | 3 | 4 | 7 | 8 | 9 | 5 | 6 |
| Materials | Paint | Acrylmelamine paint (product A) | | | | | | | | | | Urethane paint (product B) | | | | |
| Peeling conditions | Heating temp. (°C.) | Room temp. | 40 | 40 | 65 | 65 | 65 | Room temp. | Room temp. | 65 | 65 | 50 | 50 | 50 | 50 | 50 |
| | Roll temp. (°C.) | Room temp. | 40 | 40 | 40 | 40 | 40 | Room temp. | Room temp. | 40 | 40 | 40 | 40 | 40 | 40 | 40 |
| | Roll gap (mm) | 1.5 | 1.5 | 1.5 | 2.0 | 1.5 | 1.0 | 3.0 | 1.5 | 3.0 | 1.5 | 2.0 | 1.5 | 1.0 | 3.0 | 1.5 |
| | Rotating speed of roll (rpm) On substrate side | 6 | 6 | 6 | 6 | 6 | 6 | 6 | 6 | 6 | 20 | 6 | 6 | 6 | 6 | 20 |
| | On coating side | 24 | 24 | 60 | 24 | 24 | 24 | 24 | 6 | 24 | 20 | 24 | 24 | 21 | 24 | 20 |
| Results of peeling | Peeling | ○ | ○ | ◎ | ○ | ◎ | ◎ | X | X | X | X | ○ | ○ | ◎ | X | X |

TABLE 2

| | | Examples | | | | Comp. Examples | | Examples | | Comp. Ex. | Examples | | | | | Comp. Examples | |
|---|---|---|---|---|---|---|---|---|---|---|---|---|---|---|---|---|---|
| | | 10 | 11 | 12 | 13 | 7 | 8 | 13 | 14 | 9 | 15 | 16 | 17 | 18 | 19 | 10 | 11 |
| Materials | Paint | Acrylmelamine paint (product C) (no primer) | | | | | | Urethane paint (product D) (no primer) | | | Acrylmelamine paint (product E) | | | | | | |
| Peeling conditions | Heating temp. (°C.) | Room temp. | Room temp. | 40 | 60 | 40 | 60 | Room temp. | 60 | 60 | Room temp. | Room temp. | Room temp. | 40 | 40 | 40 | 40 |
| | Roll temp. (°C.) | 40 | 40 | 40 | 40 | 40 | 40 | 40 | 40 | 40 | 40 | 40 | 40 | 40 | 40 | 40 | 40 |
| | Roll gap (mm) | 1.5 | 1.0 | 1.5 | 1.5 | 3.0 | 1.5 | 1.5 | 1.5 | 1.5 | 0.5 | 0.7 | 1.0 | 0.7 | 1.0 | 2.0 | 1.0 |
| | Rotating speed of roll (rpm) On substrate side | 6 | 6 | 6 | 6 | 6 | 24 | 6 | 6 | 24 | 6 | 6 | 6 | 6 | 6 | 6 | 24 |
| | On coating side | 24 | 24 | 24 | 24 | 24 | 24 | 24 | 24 | 24 | 24 | 24 | 24 | 24 | 24 | 24 | 24 |
| Results of peeling | Peeling | ○ | ◎ | ○ | ○ | X | X | ○ | ○ | X | ○ | ○ | ○ | ◎ | ○ | X | X |

TABLE 3

| | | Examples | | | Comp. Ex. | Examples | | Comp. Ex. |
|---|---|---|---|---|---|---|---|---|
| | | 20 | 21 | 22 | 12 | 23 | 24 | 13 |
| Materials | Paint | Acrylmelamine paint (product F) | | | | Acrylmelamine paint (product G) | | |
| Peeling conditions | Heating temp. (°C.) | 50 | 50 | 50 | 50 | 50 | 50 | 50 |
| | Roll temp. (°C.) | 40 | 40 | 40 | 40 | 40 | 40 | 40 |
| | Roll gap (mm) | 2.0 | 1.5 | 1.0 | 3.0 | 1.5 | 1.0 | 3.0 |
| | Rotating speed of roll (rpm) On substrate side | 6 | 6 | 6 | 6 | 6 | 6 | 6 |
| | On coating side | 24 | 24 | 24 | 24 | 24 | 24 | 24 |
| Results of peeling | Peeling | ○ | ◎ | ◎ | X | ◎ | ◎ | X |

TABLE 4

| | | Examples | | | | | Comp. Ex. |
|---|---|---|---|---|---|---|---|
| | | 25 | 26 | 27 | 28 | 29 | 14 |
| Materials | Size (mm) | 120 × 120 | 50 × 50 | 5 × 5 | 5 × 5 | 5 × 5 | 5 × 5 |
| | Paint | Acrylmelamine paint (product A) | | | | | |
| Peeling conditions | Heating temp. (°C.) | 60 | 60 | 60 | 60 | 60 | 60 |
| | Roll temp. (°C.) | 40 | 40 | 40 | 40 | 40 | 40 |
| | Roll gap (mm) | 1.0 | 1.0 | 1.0 | 1.0 | 0.7 | 1.0 |
| | Rotating speed of roll (rpm) On substrate side | 6 | 6 | 6 | 6 | 6 | 24 |
| | On coating side | 24 | 24 | 24 | 48 | 24 | 24 |
| Results of peeling | Peeling | ○ | ○ | ○ | ○ | ○ | X |

TABLE 5

|  |  | Examples | | | | Comp. Examples | |
|---|---|---|---|---|---|---|---|
|  |  | 30 | 31 | 32 | 33 | 15 | 16 |
| Materials | Paint | Acrylmelamine paint (product A) | | | | | |
| Peeling conditions | Heating temp. (°C.) | 40 | 40 | 40 | 40 | 40 | 40 |
|  | Roll temp. (°C.) | 40 | 40 | 40 | 40 | 40 | 40 |
|  | Roll gap (mm) | 2.0 | 1.5 | 1.0 | 1.5 | 1.5 | 3.0 |
|  | Rotating speed of roll (rpm) On substrate side | 6 | 6 | 6 | 6 | 40 | 6 |
|  | On coating side | 24 | 24 | 24 | 40 | 40 | 40 |
| Results of peeling | Peeling | ◯ | ◯ | ◉ | ◉ | X | X |

Evaluation criteria

The evaluation criteria for the results of peeling of coating given in Tables 1 to 5 are as follows.

◉ : Coating completely peeled.

◯ : About 80 to 95% of coating peeled.

X : Coating remained unpeeled.

Examples 34 to 43 and Comparative Examples 17 to 20

(1) Production of substrate resin

A substrate resin having a melting point of 165° C. was prepared in the same manner as in Example 1.

(2) Production of coated plastic product (a) Production of injection-molded product The above substrate resin was subjected to injection molding using an N-100BII injection molding machine manufactured by The Japan Steel Works, Ltd. under the conditions of a molding temperature of 220° C. and an injection pressure of 600 kg/cm$^2$ into an injection-molded product having a size of 120 mm×120 mm×3.5 mm.

(b) Application of primer

The above injection-molded product was cleaned with a vapor of 1,1,1-trichloroethane, and a primer composed mainly of a chlorinated polypropylene resin was applied onto the product to form a 5 μm-thick primer coating.

(c) Production of coated plastic products

Production of coated plastic product H

A one-pack type white paint comprising an acrylic resin as a resin component and a melamine crosslinking component was coated on the primer-coated injection-molded product (120 mm×120 mm×3.5 mm) to form a 40 μm-thick coating which was then baked in an oven at a temperature of 100° C. for 60 minutes to prepare a coated plastic product H.

Production of coated plastic product I

A two-pack type white paint comprising a urethane resin as a resin component and a urethane crosslinking component was coated on the primer-coated injection-molded product (120 mm×120 mm×3.5 mm) to form a 40 μm-thick coating which was then baked in an oven at a temperature of 90° C. for 30 minutes to prepare a coated plastic product I.

Production of coated plastic product J

The above injection-molded product (120 mm×120 mm ×3.5 mm) was subjected to a plasma treatment [apparatus: microwave plasma treatment apparatus (TMZ-9602B manufactured by Toshiba Corp.), conditions: oxygen gas flow rate 400 cc/min, pressure 0.5 Torr, output 400 W, treatment time 10 seconds] by a method described in Japanese Patent Application Laid-Open No. 98140/1984, and a one-pack type white paint comprising an acrylic resin having a urethane bond as a resin component and a melamine crosslinking component was coated on the treated injection-molded product to form a 40 μm-thick coating which was then baked in an oven at a temperature of 120° C. for 30 minutes to prepare a coated plastic product J.

(3) Peeling of coating from coated plastic product

Peeling of a coating from the above coated plastic products H and I was conducted by means of the following apparatus after the following heat treatment.

In Examples 40 to 43, brushing was carried out after the peeling of a coating.

(a) Heat treatment

The coated plastic products H and I were heated using an electric hot air drier at a temperature in the range of from 30° to 170° C. for 2 hours.

(b) Peeling of coating

Thereafter, peeling of a coating by the roll process was carried out by means of an apparatus comprising a pair of rolls with a gap therebetween. The two rolls, which were identical to each other, were chrome-plated metallic rolls with a specular surface having a diameter of 152.4 mmø and a length of 380 mm. The rotating speed was 16 rpm for the roll to be in contact with the substrate and 20 rpm for the roll to be in contact with the coating. Heating of the rolls was carried out with an electric heater at a temperature in the range of from 70° to 170° C. The width of the gap between the rolls was varied in the range of from 1.5 to 3.0 mm.

In Examples 37, 38, 42 and 43, the rotating speed was 6 rpm for the roll to be in contact with the substrate and 24 rpm for the roll to be in contact with the coating.

(c) Brushing

The above brushing was carried out by using a steel brush to the coat-peeled products.

The results are shown in Tables 6 and 7.

(4) Remolding

The plastic product of Example 36, from which the oating had been peeled by the above method, was pulverized in a pulverizer and then placed in an extruder. The pulverized material was heat-melted, kneaded and pelletized, and the pellets were injection-molded to prepare a recycled plastic product, which was then coated with a paint in the same manner as in Example 36. The mechanical properties (impact strength, rigidity and elongation) of the recycled coated plastic product were measured and found to be substantially the same as those of the original product prepared using a virgin resin, i.e. the coated plastic product of Example 36. The appearance was also substantially the same as that of the coated plastic product of Example 36.

Examples 44 to 48 and Comparative Example 21

The procedure of Example 35 was repeated except that the sheet of the coated plastic product H was cut by means of a cutter into the sizes indicated in Table 8 and the peeling of a coating was conducted under the conditions indicated in Table 8. In Example 48, the rotation speeds of the rolls were the same as those in Example 37.

The results are shown in Table 8.

Comparative Examples 22 to 26

(1) Peeling of coating

The coated plastic products H, I and J were used. They were heated at a temperature of from 30° to 100° C. for 1 hour as indicated in Table 9 by using the same drier as in Example 34 and taken out of the drier. The coating was scraped off with a wire brush and the scraped coating was blown off with a compressed air of 3 kg/cm$^2$. The results are shown in Table 9.

Comparative Example 27

The coated plastic H were cut into pieces of a size of about 5 to 10 mm. The pieces were then heat-treated at a temperature of 30° C. as indicated in Table 10 for 2 hours using the same dryer as in Example 34.

Then, the heat-treated pieces were placed in a Henschel mixer having an internal capacity of 20 liters, and the mixer was rotated at a speed of 1,000 rpm for 5 minutes to permit the pieces themselves to collide against one another, thereby peeling the coating.

The results are shown in Table 10.

Examples 49 to 59 and Comparative Examples 28 to 31

Peeling of a coating for the coated plastic product H was carried out by the above apparatus using rolls having a specular surface or an embossed surface under the conditions of a roll gap of 1.0 to 3.5 mm and a roll rotating speed of 6 to 24 rpm for the roll on the side of the substrate and 12 to 60 rpm for the roll on the side of the coating. The results are shown in Table 11.
Evaluation criteria The evaluation criteria for the results of peeling of coating given in Tables 6 to 11 are the same as those in Tables 1 to 5.

TABLE 8

|  |  | Examples | | | | Comp. Example | Example |
| --- | --- | --- | --- | --- | --- | --- | --- |
|  |  | 44 | 45 | 46 | 47 | 21 | 48 |
| Materials | Size (mm) | 120 × 120 | 10 × 10 | 5 × 5 | 5 × 5 | 5 × 5 | 5 × 5 |
| Peeling conditions | Heating temp.(°C.) | 150 | 150 | 150 | 160 | 150 | 70 |
|  | Roll temp.(°C.) | 100 | 100 | 100 | 100 | 170 | 70 |
|  | Roll gap (mm) | 1.0 | 1.0 | 1.0 | 1.0 | 1.0 | 1.0 |
| Results of peeling | Peeling | ○ | ○ | ○ | ○ | X Coating film included into resin | ○ |

TABLE 6

|  |  | Examples | | | Comp. Examples | | | Examples | |
| --- | --- | --- | --- | --- | --- | --- | --- | --- | --- |
|  |  | 34 | 35 | 36 | 17 | 18 | 19 | 37 | 38 |
| Materials | Paint | Acrylmelamine paint (product H) | | | | | | | |
| Peeling conditions | Heating temp. (°C.) | 130 | 150 | 160 | 170 | 30 | 30 | 70 | 70 |
|  | Roll temp. (°C.) | 100 | 100 | 100 | 170 | 170 | 170 | 70 | 100 |
|  | Roll gap (mm) | 1.5 | 2.5 | 2.0 | 2.0 | 3.0 | 2.0 | 1.5 | 1.5 |
|  | Brushing temp. (°C.) | — | — | — | — | — | — | — | — |
| Results of peeling | Peeling | ○ | ○ | ○ | — Impossible to peel due to melting | X Coating included into resin | X Coating included into resin | ○ | ○ |

TABLE 7

|  |  | Comp. Example | Examples | | | | |
| --- | --- | --- | --- | --- | --- | --- | --- |
|  |  | 20 | 39 | 40 | 41 | 42 | 43 |
| Materials | Paint | Urethane paint (product I) | | Acrylmelamine paint (product H) | | Urethane paint (product I) | |
| Peeling conditions | Heating temp. (°C.) | 170 | 150 | 160 | 150 | 70 | 70 |
|  | Roll temp. (°C.) | 170 | 100 | 100 | 100 | 70 | 70 |
|  | Roll gap (mm) | 2.0 | 2.5 | 2.5 | 2.0 | 1.5 | 1.5 |
|  | Brushing temp. (°C.) | — | — | 150 | 140 | 70 | 70 |
| Results of peeling | Peeling | X Impossible to peel due to melting | ○ | ◎ | ◎ | ○ | ○ |

TABLE 9

|  |  | Comp. Example 22 | Comp. Example 23 | Comp. Examples 24 | Comp. Examples 25 | Comp. Examples 26 |
| --- | --- | --- | --- | --- | --- | --- |
| Materials | Primer | Primer coated | | | Primer not coated | |
|  | Paint | Acrylmelamine paint (product H) | Urethane paint (product I) | Acrylmelamine paint (product J) | | |
| Peeling conditions | Heating temp.(°C.) | 30 | 30 | 30 | 100 | 60 |
|  | Peeling temp.(°C.) | 30 | 30 | 30 | 30 | 60 |
| Results of peeling | Peeling | X | X | X | X | X |

TABLE 10

|  |  | Comp. Example 27 |
| --- | --- | --- |
| Material | Paint | Acryl paint (product H) |
| Peeling conditions | Heating temp.(°C.) | 30 |
|  | Peeling temp.(°C.) | 30 |
| Results of peeling | Peeling | X |

TABLE 11

|  |  | Examples | | | | | | | | Comp. Examples | | Examples | | | Comp. Examples | |
| --- | --- | --- | --- | --- | --- | --- | --- | --- | --- | --- | --- | --- | --- | --- | --- | --- |
|  |  | 49 | 50 | 51 | 52 | 53 | 54 | 55 | 56 | 28 | 29 | 57 | 58 | 59 | 30 | 31 |
| Materials | Paint | Acrylmelamine paint (product H) | | | | | | | | | | | | | | |
| Peeling conditions | Finishing of roll surface | Planishing | | | | | | | | | | Embossing | | | | |
|  | Heating temp. (°C.) | 70 | 70 | 70 | 70 | 70 | 70 | 70 | 70 | 70 | 70 | 70 | 70 | 70 | 70 | 70 |
|  | Roll temp. (°C.) | 70 | 70 | 70 | 70 | 70 | 70 | 70 | 70 | 70 | 70 | 70 | 70 | 70 | 70 | 70 |
|  | Roll gap (mm) | 1.5 | 1.0 | 2.5 | 2.0 | 1.5 | 1.0 | 2.5 | 2.0 | 3.5 | 2.0 | 2.5 | 2.0 | 1.5 | 3.5 | 2.0 |
|  | Rotating speed of roll (rpm) On substrate side | 6 | 6 | 6 | 6 | 6 | 6 | 6 | 6 | 6 | 24 | 6 | 6 | 6 | 6 | 24 |
|  | On coating side | 12 | 12 | 24 | 24 | 24 | 24 | 60 | 60 | 24 | 24 | 24 | 24 | 24 | 24 | 24 |
| Results of peeling | Peeling | ○ | ◎ | ○ | ○ | ◎ | ◎ | ◎ | ◎ | X | X | ◎ | ◎ | ◎ | X | X |

What is claimed is:

1. An apparatus for peeling a coating from coated plastics, comprising a pair of rolls with a gap therebetween, wherein at least one roll of said pair of rolls is continuously tapered so that the diameter of said roll gradually increases from the midpoint toward the edges of the roll, and driving means for rotating the pair of rolls, said rolls rotating at different peripheral speeds from each other and allowing a plastic body having a coating thereon to pass through the gap while applying a shear stress to the plastic body thereby to peel the coating from the plastic body.

2. The apparatus according to claim 1, wherein said rolls are metallic rolls.

3. The apparatus according to claim 1, wherein said pair of rolls are identical to each other in diameter but different in rotations per unit time.

4. The apparatus according to claim 1, wherein said pair of rolls are identical to each other in rotations per unit time but different in diameter.

5. The apparatus according to claim 1 further comprising a member provided in contact with one roll of the pair of rolls, said member scraping off the coating adhering to the roll.

6. The apparatus according to claim 1, wherein at least one of the pair of rolls is covered with an elastic material.

7. The apparatus according to claim 1 further comprising means provided on the downstream side of said pair of rolls for removing the coating remaining unremoved on the plastic body.

8. The apparatus according to claim 1, wherein said plastic body has the coating on its one surface, and one roll of the pair of rolls which is to be contacted with said one surface has a higher peripheral speed than the other roll.

9. An apparatus for peeling a coating from coated plastics, comprising:

a pair of rolls with a gap therebetween, wherein at least one roll of said pair of rolls is continuously tapered so that the diameter of said roll gradually increases from the midpoint toward the edges of the roll, and driving means for rotating the pair of rolls at different peripheral speeds from each other.

10. The apparatus of claim 9, further comprising means provided on the downstream side of said pair of rolls for removing any coating remaining unremoved from a coated plastic.

11. The apparatus of claim 9, further comprising means for removing any coating which adheres to one roll of said pair of rolls.

* * * * *

UNITED STATES PATENT AND TRADEMARK OFFICE
CERTIFICATE OF CORRECTION

PATENT NO.  : 5,788,811
DATED       : August 4, 1998
INVENTOR(S) : Hiroshi YAMAMOTO, et al.

It is certified that error appears in the above-identified patent and that said Letters Patent is hereby corrected as shown below:

On the title page in Item [30], the second and third Foreign Applications listed are incorrect. They should read:

--Feb. 7, 1994    [JP]    Japan...........6-013821--
--Feb. 7, 1994    [JP]    Japan...........6-013822--

Signed and Sealed this

Second Day of March, 1999

*Attest:*

Q. TODD DICKINSON

*Attesting Officer*    Acting Commissioner of Patents and Trademarks